United States Patent
Hao

(10) Patent No.: US 8,855,104 B2
(45) Date of Patent: Oct. 7, 2014

(54) METHOD FOR SWITCHING THE SESSION CONTROL PATH OF IP MULTIMEDIA CORE NETWORK SUBSYSTEM CENTRALIZED SERVICE

(75) Inventor: Zhenwu Hao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 665 days.

(21) Appl. No.: 12/671,344

(22) PCT Filed: Dec. 4, 2007

(86) PCT No.: PCT/CN2007/003440
§ 371 (c)(1),
(2), (4) Date: Jan. 29, 2010

(87) PCT Pub. No.: WO2009/015525
PCT Pub. Date: Feb. 5, 2009

(65) Prior Publication Data
US 2010/0195644 A1 Aug. 5, 2010

(30) Foreign Application Priority Data

Jul. 31, 2007 (CN) .......................... 2007 1 0141523

(51) Int. Cl.
| | |
|---|---|
| *H04L 12/66* | (2006.01) |
| *H04W 36/00* | (2009.01) |
| *H04L 29/06* | (2006.01) |
| *H04W 28/04* | (2009.01) |
| *H04W 80/10* | (2009.01) |
| *H04W 48/08* | (2009.01) |

(52) U.S. Cl.
CPC ....... *H04L 65/1083* (2013.01); *H04W 36/0022* (2013.01); *H04L 65/1016* (2013.01); *H04W 28/04* (2013.01); *H04W 80/10* (2013.01); *H04W 48/08* (2013.01)
USPC ........... 370/352; 370/356; 370/353; 370/355; 370/354; 370/329; 370/328

(58) Field of Classification Search
USPC .................................. 370/352–356, 328, 329
See application file for complete search history.

(56) References Cited

U.S. PATENT DOCUMENTS

| | | |
|---|---|---|
| 2003/0046384 A1 | 3/2003 | Sirivara |
| 2006/0153174 A1 | 7/2006 | Towns-Von Stauber et al. |

(Continued)

FOREIGN PATENT DOCUMENTS

| | | |
|---|---|---|
| CN | 1881958 | 12/2006 |
| CN | 1882119 | 12/2006 |

(Continued)

OTHER PUBLICATIONS

3rd Gerneration Partnership Project; Technical Specification Group Services and System Aspects; IP Multimedia System (IMS) Centeralized Services (Release 8); 3GPP TR 23.892 V1.0.0 (Jun. 2007).*

(Continued)

*Primary Examiner* — Khaled Kassim
(74) *Attorney, Agent, or Firm* — Banner & Witcoff, Ltd.

(57) ABSTRACT

A method for switching the session control path of IMS centralized services is provided. When the condition for switching the session control path is satisfied during the ICS session based on the first session control path, the following steps are performed: one party of the ICS UE and ICCF of the ICS session transmits the request of switching the session control path to the other party; the receiving party identifies the ICS session corresponding to the request, and transmits an acknowledgement response to the transmitting party; and the ICCF and ICS UE set the session control path corresponding to the identified ICS session as the second session control path and transfer the subsequent session control information associated with the ICS session via the second session control path; wherein the first or second session control path is one of the PS session control path and the CS session control path.

9 Claims, 3 Drawing Sheets

(56) References Cited

U.S. PATENT DOCUMENTS

| | | | |
|---|---|---|---|
| 2007/0058791 A1 | 3/2007 | Liu et al. | |
| 2008/0037501 A1* | 2/2008 | Ali et al. | 370/342 |
| 2009/0003276 A1* | 1/2009 | Mutikainen et al. | 370/329 |
| 2009/0196286 A1* | 8/2009 | Long et al. | 370/352 |
| 2009/0207807 A1* | 8/2009 | Mahdi et al. | 370/331 |
| 2009/0323656 A1* | 12/2009 | Mahdi | 370/338 |

FOREIGN PATENT DOCUMENTS

| | | |
|---|---|---|
| EP | 1450514 A1 | 8/2004 |
| JP | 2006080673 A | 3/2006 |
| WO | 2006010614 A2 | 2/2006 |

OTHER PUBLICATIONS

International Search Report, Apr. 2008.
Supplemental European Search Report issued in corresponding European Application, Application No. EP 07845801, issued on Apr. 14, 2011.
Huawei: "LTE-CS voice call continuity using CS-PS handover, PCC and ICS," 3GPP Draft; S2-073105_Rev1, 3rd Generation Partnership Project (3GPP), Mobile Competence Centre; 650, Route Des Lucioles; F-06921 Sophia-Antipolis Cedex; France, vol. SA WG2, No. Orlando; 20070726, Jul. 26, 2007, XP050260546, [retrieved on Jul. 26, 2007].
Vodafone: "TR 23.882 v1.10.0," 3GPP Draft, S2-072781, 3rd Generation Partnership Project (3GPP), Mobile Competence Centre; 650, Route Des Lucioles; F-06921 Sophia-Antipolis Cedex; France, vol. SA WG2, No. Orlando; 20070619, Jul. 19, 2007, XP050260311, [retrieved on Jul. 19, 2007].
Friedman, T., et al.: "RTP Control Protocol Extended Reports (RTCP XR); rfc3611.txt" IETF Standard, Internet Engineering Task Force (Nov. 1, 2003).
Supplementary European Search Report issued in corresponding European patent application, Application No. EP 07816730.1, on Aug. 5, 2010.

* cited by examiner

METHOD FOR SWITCHING THE SESSION CONTROL PATH OF IP MULTIMEDIA CORE NETWORK SUBSYSTEM CENTRALIZED SERVICE

TECHNICAL FIELD

The present invention relates to the methods for implementing the IP multimedia core network subsystem centralized services, and more especially, to a method for switching the session control path of the IP multimedia core network subsystem centralized services.

BACKGROUND

Internet Protocol (IP) Multimedia Core Network Subsystem (IMS) is an IP-based network architecture proposed by the 3$^{rd}$ Generation Partnership Project (3GPP), and it constructs an open and flexible service environment to support multimedia applications and provide the users with enriched multimedia services.

IMS is IP-based telecommunication network architecture with no relationship with the access technology; it can provide services for mobile cellular networks such as Global System for Mobile communications (GSM) and Universal Mobile Telecommunications System (UMTS), besides for Packet Switched (PS) access networks such as General Packet Radio Service (GPRS), Wireless Local Area Network (WLAN), and so on.

The voice communication in the mobile cellular networks such as the GSM and UMTS applies circuit switched technology, and it is called as Circuit Switched (CS) domain which can provide the users the basic voice services and the supplementary services based on voice service. When the CS domain accesses to the IMS, the 3GPP SA2 workgroup proposed IMS Centralized Service (ICS) in order to make the CS users use the uniform IMS service interface, guarantee the consistency and continuity of the services and provide the users with consistent user experience.

IMS centralized services have the following advantages:

(1) The IMS provides service consistency in circuit switched domain and in packet switched domain and supports network integration;

(2) It supports the evolvement from the CS network to the IMS network.

FIG. 1 is an illustration of the application scenarios of the IMS centralized services. As shown in FIG. 1, the ICS user equipment (101) can access to the IP multimedia core network subsystem (104) in the CS domain or PS domain. When both the CS access (102) and the PS access (103) are available and the PS access does not support the bi-directional voice media communication capability, the ICS user equipment should establish CS bearer path and bearer control path via the CS access, and establish the CS session control path via the CS access or the PS session control path via the PS access, and access to the IP multimedia subsystem to implement IMS centralized services.

FIG. 2 is an illustration of the reference architecture of the system of the IMS centralized services. As shown in FIG. 2, the IMS centralized services mainly relate to the following network element equipments:

201: User equipment, UE for short;
202: Visited Mobile Switch Center, VMSC for short;
203: Home Subscriber Server, HSS for short;
204: Media Gateway Control Function, MGCF for short;
205: Media Gateway, MGW for short;
206: IMS CS Control Function, ICCF for short;
207: Call Session Control Function, CSCF for short.

As shown in FIG. 2, the ICS UE should establish several logical paths to ICCF to access to the IMS: session control path, bearer control path and bearer path.

Wherein, there are the following two bearing ways for the session control path:

(1) Bearing in the CS domain, apply unstructured supplementary service data (USSD) to establish CS session control path through the VMSC and the HSS;

(2) Bearing in the PS domain, apply the Session Initial Protocol (SIP) to establish the PS session control path through the CSCF in the IMS domain and the IP bearer network.

The bearer control path: the UE applies the standard CS control signaling to access to the VMSC, accesses to the IMS through the MGCF, and establishes a bearer control path to the ICCF through the CSCF.

The bearer path: the UE accesses to the IMS through the VMSC and the MGW and establishes a bearer path to establish media connection with the remote UE in the session.

The IMS centralized service uses the session control path to exchange the session control message between the UE and the ICCF, and establish and control the media bearer through the bearer control path, the ICCF acts as the IMS User Agent (UA) to replace the UE to access to the IMS.

For the detailed information of the IMS centralized services, please refer to 3GPP TR23.892: "IP Multimedia System centralized services".

According to different session control path bearing ways, the implementations of the IMS centralized services are divided into the CS control (Il-cs) and the PS control (Il-ps).

The CS and PS control s have their own advantages and disadvantages. Specifically, the CS session control path uses the USSD transfer mechanism existing in the CS domain, thus it has low requirements for the UE and the network, and when the CS network supports the USSD, the CS control can be applied, however, the USSD message can only transfer 160 byte data at most for one time, and the transmission bandwidth and the service capability are limited; In contrast, the PS session control path uses the PS bearer and has relatively high requirements for the UE and the network, and it requires the user equipment to support the CS and the PS at the same time, however, it has relatively greater bandwidth and stronger service control capability.

In the ICS session based on the PS session control path, when there is PS resource congestion or the CS domain control needs to be used according to the service requirements, the session control path needs to be switched to the CS domain, that is, the CS session control path is applied to control the ICS session; similarly, in the ICS session based on the CS session control path, when the PS control needs to be used according to the service requirements, the session control path needs to be switched to the PS domain, that is, the PS session control path is applied to control the ICS session.

In the prior art, when switching the above session control path, generally the related session is terminated and the corresponding bearer path and bearer control path is released, however, in this way the user call will be affected and the user satisfaction will be degraded.

SUMMARY OF THE INVENTION

The present invention provides a method for switching the session control path, wherein, the ICS session is switched from the PS session control path to the CS session control path or from the CS session control path to the PS session control path without discontinuing the call, so as to overcome the shortcoming of the prior art.

In order to solve the above problem, the present invention provides a method for switching the session control path of the IP multimedia core network subsystem, and in the ICS session based on the first session control path, when the condition for switching the session control path is satisfied, the following steps are performed:

A: one party of the ICS UE and the ICCF corresponding to the ICS session sends a request for switching the session control path to the other party;

B: After the receiving party of the above session control path switching request receives the request, it identifies the ICS session corresponding to the request and sends the transmitting party a response of session control path switching acknowledgement;

C: Said ICCF and ICS UE set the session control path corresponding to the identified ICS session as the second session control path, and the subsequent session control information associated with the ICS session is transferred through the second session control path;

Wherein, the above first or second session control path is one of the PS and CS session control paths; and the first and second session control paths are of different kinds.

Furthermore, said condition for switching the session control path is one or several of the following: the domain interface corresponding to said first session control path does not meet the communication requirement of the session control path or is not available, while the domain interface corresponding to the second session control path meets the communication requirement of the session control path; according to the service requirements, it is needed to switch the session control path to the second session control path; the message indicating to switch the session control path from the network according to the operator's strategy is received; the session control path is switched to the second session control path based on the IMS network management strategy.

Furthermore, said request for switching the session control path has the relevant information which is used to identify the ICS session for which another session control path will be switched in said step B;

When said first and second session control paths are the CS session control path and the PS session control path respectively, said relevant information is the dialog identifier or the voice call continuity switching identifier of said ICS session;

When said first and second session control paths are the PS session control path and the CS session control path respectively, said relevant information is the dialog identifier or the voice call continuity switching number of said ICS session.

Furthermore, said request for switching the session control path and said response of the session control path switching acknowledgement are sent through the bearer domain corresponding to said second session control path.

Furthermore, said first and second session control paths are the CS session control path and the PS session control path respectively; and there is the following step before said step A: the ICS UE corresponding to said ICS session performs the IMS registration.

Furthermore, said first and second session control paths are the CS session control path and the PS session control path respectively; said request for switching the session control path is the SIP INVITE message; by adding new header field into the INVITE message or using the parameters in the header field or the message body, it is to indicate that the message is the request for switching the session control path; if the voice call continuity switching identifier acts as said relevant information, it is put into the called number field in said INVITE message; if the dialog identifier is taken as said relevant message, this dialog identifier is carried in the REPLACE header or other header fields, or parameters in said INVITE message.

Furthermore, said first and second session control paths are the CS session control path and PS session control path respectively; there are the following steps between step A and step B: after the receiving party of said session control path switching request receives the request, it sends one or several provisional response messages including the processing progress information and/or the media negotiation information to the transmitting party of the request; the receiving party of the provisonal response messages returns a message including the media negotiation information.

Furthermore, said first and second session control paths are the PS session control path and CS session control path respectively; there is the following step between step A and step B: one party of the ICS UE and the ICCF corresponding to said ICS session initiates to establish a CS session control path to the other party.

Furthermore, there are the following steps following said step C:

D: One party of the ICS UE and the ICCF sends the request for releasing the first session control path to the other party;

E: The ICS UE and the ICCF release the first session control path corresponding to the ICS session.

Furthermore, said first and second session control paths are the PS session control path and CS session control path respectively; said request for releasing the first session control path includes the information which is used to indicate the receiving party of the request to only release the first session control path corresponding to the request while not to release the bearer control path and the bearer path of the corresponding ICS session.

With the method of the present invention, on the premise of guaranteeing the continuity of the voice communication while not releasing the bearer control path and the bearer path corresponding to the session, switching can be performed between the CS session control path and the PS session control path according to different service requirements and the bearer load in the PS and CS domains, thus guaranteeing the service quality maximally and improving the degree of satisfaction of the users.

THE PREFERRED EMBODIMENTS OF THE PRESENT INVENTION

From the above description, it can be seen that when the ICS UE accesses to the IMS, a session control path should generally be established between the UE and the ICCF, and when the ICS UE using the PS/CS session control path is in a call and the condition for switching the session control path is satisfied, in the process of switching the session control path introduced in the present invention, the session control path will be switched to the CS/PS domain to maintain the user call and meet the service requirements.

The present invention will be described in further detail in the following in combination with the accompanying figures and the embodiments.

The First Embodiment

Figure 1:
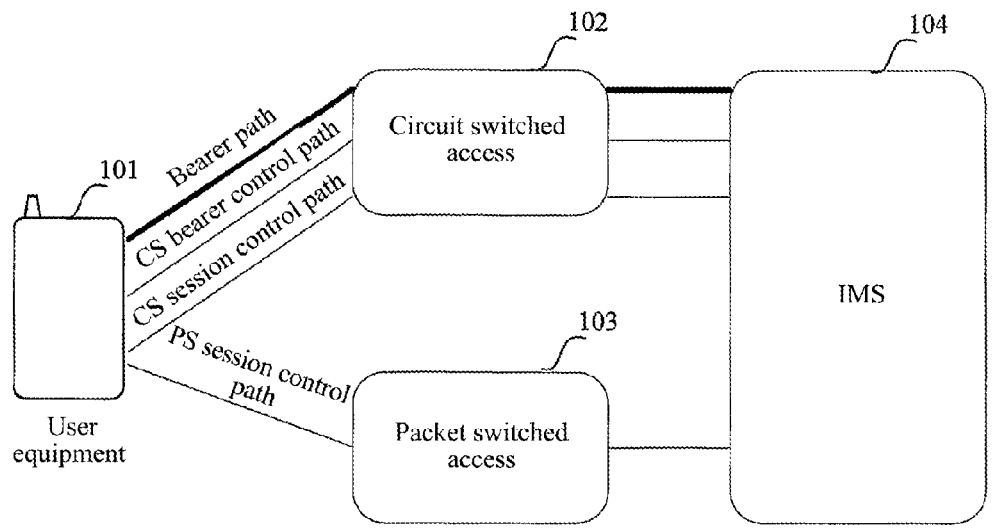
FIG. 1 is an illustration of the application scenarios of the IMS centralized services.
Figure 2:
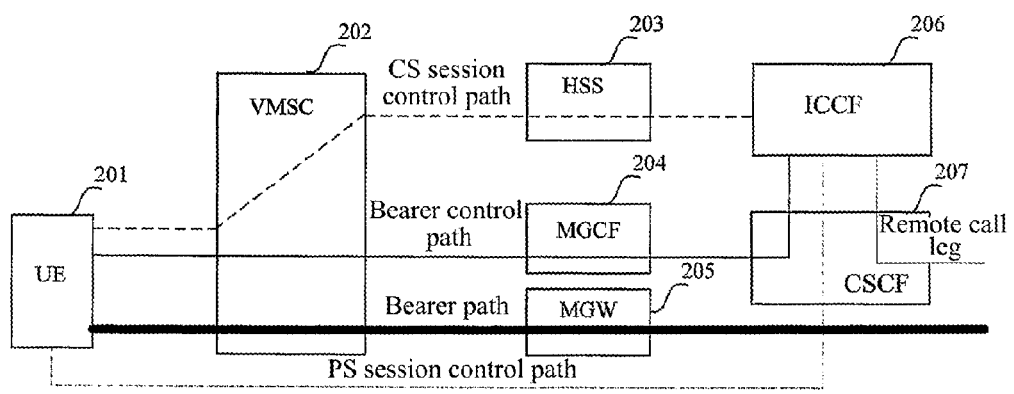
FIG. 2 is an illustration of the structure of the reference architecture of the system of IMS centralized services.
Figure 3:
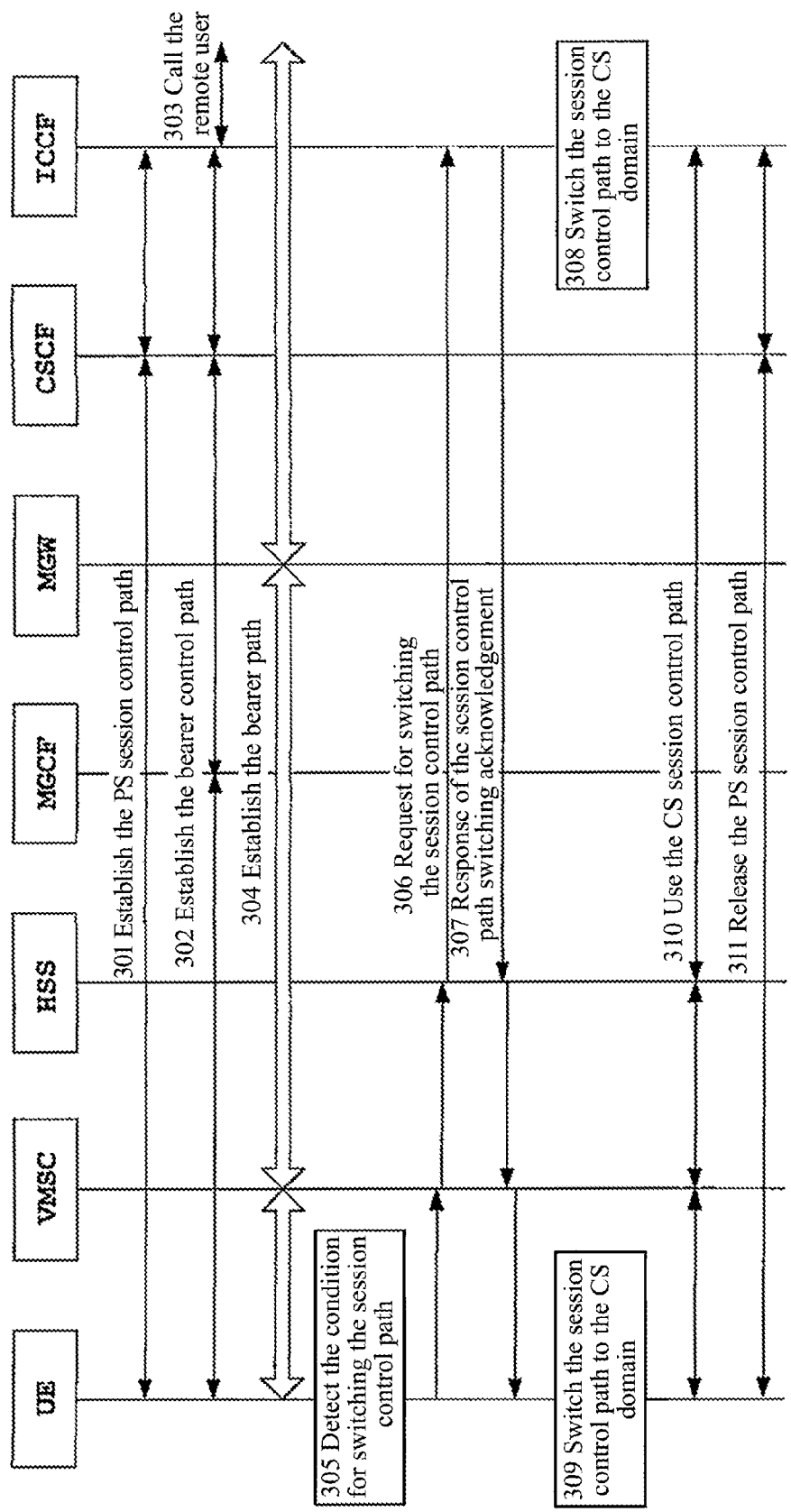
FIG. 3 is a flow chart of the method for switching the session control path in accordance with the first embodiment of the present invention.

FIG. 3 is a flow chart of the method for switching the session control path in accordance with the first embodiment of the present invention. In this embodiment, that the ICS UE initiates a call, establishes an ICS session based on the PS session control path, and switches the session control path to the CS session control path is taken as an example to describe the basic flow of the ICS session establishment and the method for switching the session control path provided in the present invention. The specific steps are as follows:

301: The ICS UE applies the SIP to establish its PS session control path to the ICCF through the CSCF, and establish its session with the ICCF through this path.

The above PS session control path is generally established by applying the SIP INVITE message and the corresponding response message, and the INVITE message includes the information of the called number.

The ICS session controlled through the PS session control path can be referred to as the SIP session.

302: the bearer control path is established between the ICS UE and the ICCF according to the session control information of the PS session control path, and the establishment of the bearer path between the ICS UE and the MGW is controlled through this path.

The ICS UE applies the standard CS calling process to access to the VMSC, establishes the bearer control path through the MGCF and CSCF in the IMS and establishes its session with the ICCF through the path.

The above session control message includes the ICCF number information and the media information.

303: the ICCF establishes a session connection with the remote user by the CSCF calling the remote user equipment according to the session message including the called number and the media information.

In this process, the ICCF uses the internal logic to relate the session between the ICS UE and the ICCF established in steps 301 and 302 with the session between the above ICCF and the remote user equipment, so as to act as the IMS user agent on behalf of the user to access to the IMS and call the remote user equipment.

304: The media plane of the ICS UE accesses to the IMS through the VMSC and the MGW, and the ICS UE establishes a bearer path to the remote user equipment.

In the steps 310~304, there is the exchange among several messages which are related to each other, and their order does not reflect the order of processing the messages in these steps.

In steps 301~304, the origination process is taken as an example, which is similar to the termination process by the called user, although the orders might be different, and the originators of establishing the PS session control path, bearer control path and the bearer path are different. When the ICCF receives the call terminated at the ICS UE, it establishes an ICS session through the PS session control path, bearer control path and the bearer path and begins to communicate.

305: the ICS UE judges whether the condition for switching the session control path is satisfied or not, and if yes, the next step is performed.

In this embodiment, the condition for switching the session control path is that the ICS UE finds out that the domain corresponding to the current used session control path, that is, the CS wireless access, is still available, and it can meet the communication requirement of the session control path while the PS domain access does not meet the communication requirement of the PS session control path or is not available.

306: the ICS UE initiates to establish its CS session control path to the ICCF and sends the request for switching the session control path to the ICCF through the path (CS domain);

This request for switching the session control path includes the relevant information which is used to determine the SIP session to be switched.

The relevant information can be the dialog ID of the SIP session on the PS session control path. Moreover, when the ICS user can also be the voice call continuity (VCC) user, the network will allocate a voice continuity domain switching number (VDN) to it for switching the call from the PS domain to the CS domain. Since the VDN can be used to uniquely identify the SIP session, it can be used as the relevant information.

For the references of voice call continuity, please refer to 3GPP TS 23.206: "Voice Call Continuity between Circuit Switched and IP Multimedia Subsystem".

307: the ICCF accepts the request for switching the session control path; performs the relevant operations, that is, identifies the ICS session corresponding to the switching request through the relevant information included in the request; returns the response of the session control path switching acknowledgement to the ICS UE through the above CS session control path;

If the ICCF does not accept the switching request, it skips the subsequent steps and returns the response of session control path switching rejection through the CS session control path, and the response might include the rejection reasons;

After receiving the rejection, the ICS UE can further decide to release the whole ICS session, or re-initiate a switching request, or only release the PS session control session while remain the corresponding bearer control path and the bearer path. When only the PS session control path is released while the corresponding bearer control path and the bearer path are remained, for some services provided by the IMS, such as the multi-party call, Conference service, and so on, some operations, such as adding new users, cannot be performed.

308: the ICCF switches the session control path of the ICS session to the CS session control path, that is, the ICCF sets the session control path to transfer the subsequent session control information related to the ICS session through the CS session control path.

309: after the ICS UE receives the response of the session control path switching acknowledgement, it switches the session control path of the ICS session to the CS session control path, that is, the ICS UE sets the session control path to transfer the subsequent session control information related to the ICS session through the CS session control path.

310: The session control information is exchanged between the ICS UE and the ICCF through the CS session control path.

311: The ICS UE and the ICCF release the PS session control path corresponding to the ICS session;

Before releasing the PS session control path, one party of the ICS UE and the ICCF sends a request for releasing the PS session control path to the other party, and the request indicates that only the PS session control path corresponding to the ICS session is released but not the corresponding bearer control path and the bearer path in the CS domain, thus guaranteeing that the voice connection corresponding to the ICS session is continuous.

Moreover, when the ICS UE has several sessions based on the PS session control path which need to be switched to the CS session control path, steps 306~309 should be repeated, and the process of switching several session control paths can be performed in parallel.

When several sessions based on the PS session control path of the ICS UE need to be switched to the CS session control path, the calling number of the ICS UE can be taken as the relevant information besides applying the method of repeating the steps 306~309, and a request for switching the session control path including the relevant information is used to switch all the sessions based on the PS session control path of the ICS UE to the CS session control path.

Based on the conception of the present invention, the following changes can be made on the basis of the above embodiment:

The condition for switching the session control path in the above step 305 can be that the session control path needs to be switched to the CS domain based on the IMS network management strategy, and if it is found out that the network resource in the PS domain is deficiency, the user is expected to switch the session control path to the CS domain.

Under this condition, the steps 306~307 can be replaced with the following steps:

306': the ICCF initiates to establish its CS session control path to the ICS UE, and sends the request for switching the session control path to the ICS UE through this path;

307': the ICS UE accepts the request for switching the session control path, and determines the ICS session corresponding to this switching request through the relevant information in the request; returns the response of the session control path switching acknowledgement to the ICCF through the above CS session control path.

The Second Embodiment

Figure 4:
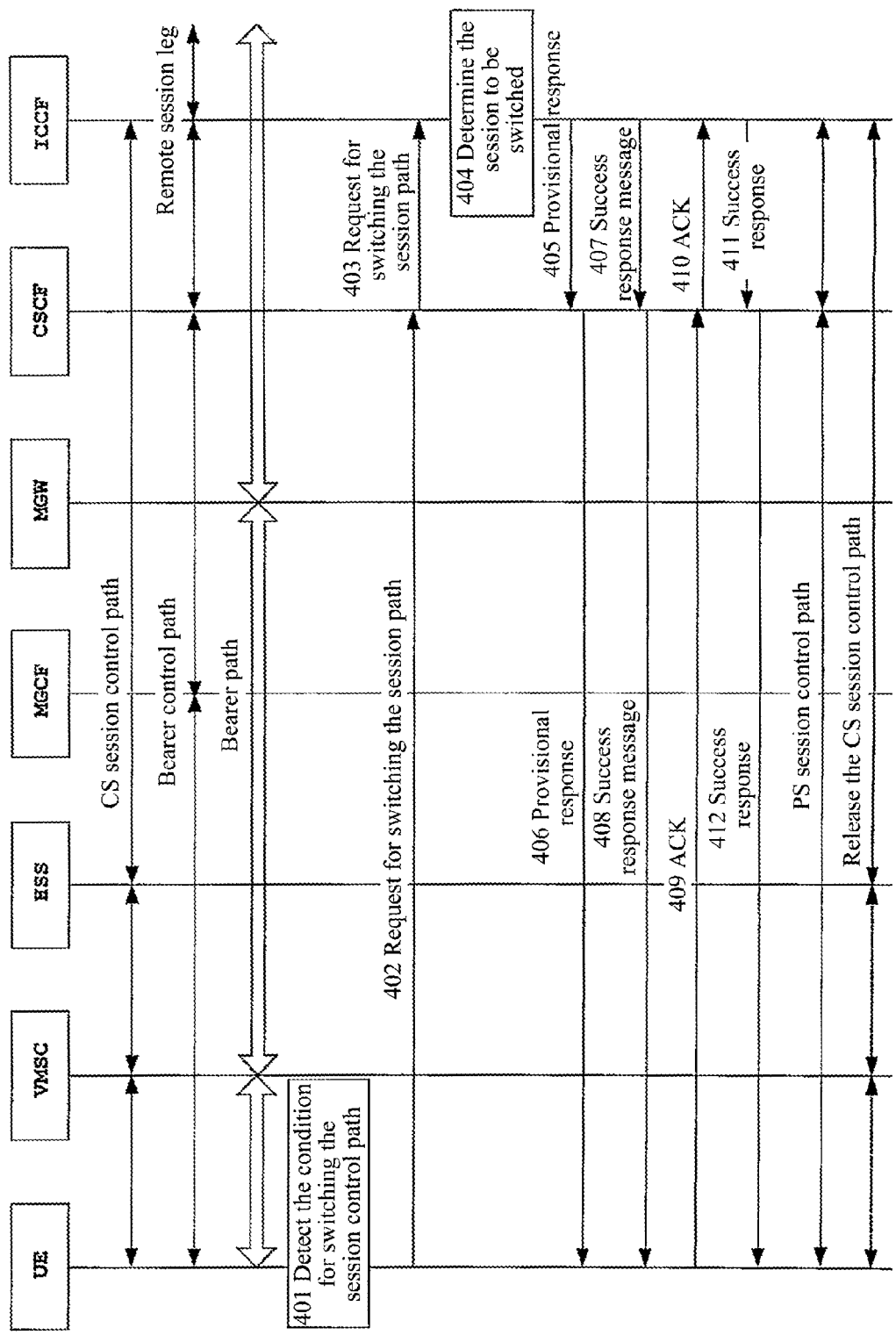
FIG. 4 is a flow chart of the method for switching the session control path in accordance with the second embodiment of the present invention.

FIG. 4 is a flow chart of the method for switching the session control path in accordance with the second embodiment of the present invention. In this embodiment, that the session control path of the ICS session based on the CS session control path is switched to the PS session control path is taken as an example to describe the detailed process of the method for switching the session control path in accordance with the present invention Since the ICS session relies on the session control path, it should establish the user call branch between the ICS UE and the ICCF through the CS session control path and the bearer control path between the ICS UE and the ICCF when establishing the call; meanwhile, the ICCF establishes the remote call leg with the remote users, controls the establishment of the bearer path between the ICS UE and the remote users, and then begins to communicate.

As shown in FIG. 4, the method for switching the session control path comprises the following steps:

401: the ICS UE judges whether the condition for switching the session control path is satisfied or not, if yes, the next step is performed to trigger the process of switching the session control path.

In this embodiment, the condition for switching the session control path means that according to the service requirements, the ICS UE finds out that it needs to apply the PS control path if the data amount of the session control message is large; or the PS domain changes from unavailable to available; or the ICS UE receives the message sent from the network indicating the ICS UE to apply the PS session control path according to the operator's strategy.

The above message indicating the ICS UE to apply the PS session control path can be sent to the ICS UE by the ICCF through the CS session control path (CS domain) in use, PS domain or the Ut interface to indicate the ICS UE to switch the session control path to the PS session control path.

402: the ICS UE sends the request for switching the session control path to the CSCF through the PS session control path (PS domain).

In this embodiment, the request for switching the session control path applies the SIP INVITE message, and a new header field in the INVITE message is added or the parameters in the header field or the message body is used to indicate that the message is the request for switching the session control path which is used to switch the CS session control path to the PS session control path, thus distinguish the INVITE message for establishing the session from the INVITE message for switching the domain for the voice call continuity.

It should be noted that before this step, the ICS UE should be successfully registered on the IMS through the PS domain. If the ICS UE is not registered, it should process the IMS registration first.

Since the ICS UE might have several sessions based on the CS session control path, it should switch some or all of these sessions to the PS session control path, thus the relevant information should be included in the request for switching the session control path (INVITE message) to indicate the session for which the session control path should be switched.

The above relevant information can be the Session Transfer Identifier assigned to the session to make it uniquely identify the session based on the CS session control path of this ICS UE. The relevant information (session transfer identifier) can be the VCC Domain Transfer URI (VDI) assigned to the session in the VCC service; or can be the dialog ID of the session.

If taking the VDI as the relevant information, the ICS UE takes the VDI as the called number of the request for switching the session control path, that is, puts the VDI into the request-URI in the INVITE message; if using the dialog ID as the relevant information, the ICS UE carries the dialog ID in the REPLACE header field or other header fields or parameters in the request for switching the session control path (INVITE message).

403: the CSCF forwards the request for switching the session control path to the ICCF.

If the request for switching the session control path uses the VDI as the relevant information, the CSCF forwards the request for switching the session control path (INVITE message) to the ICCF according to the VDI; if the dialog ID is used as the relevant information, the CSCF forwards the request for switching the session control path to the ICCF according to the service logic of the Initial Filter Criteria in the service configuration.

404: the ICCF accepts the request for switching the session control path and determines the session based on the CS session control path to be switched according to the relevant information in the request;

The ICCF switches the session control path of this session to the PS session control path, that is, the ICCF sets the session control path and transfers the subsequent session control information associated with this session through the PS session control path.

If taking the VDI as the relevant information, the ICCF determines the session based on the CS session control path to be switched according to the VDI included in the request after receiving the request for switching the session control path; if taking the dialog ID as the relevant information, the ICCF determines the session based on the CS session control path to be switched according to the dialog ID included in the request after receiving the request for switching the session control path.

If there is only one session going on at the ICE UE, the common user identifier or number of this ICE UE can be used as the relevant information. In other words, the ICS UE uses the default VDI (the default VDI of this ICS UE) or the default dialog ID (the default dialog ID of this ICS UE) in the request for switching the session control path; the ICCF uses the common user identifier of the ICS UE to relate the session with the PS session control path, that is, it determines that the corresponding session should use the PS session control path by using the common user identifier.

If the ICCF does not accept the request for switching the session control path, it should return the response of session control path switching rejection and include the rejection reasons into the message, the following steps will not be performed.

405~406: the ICCF sends one or more provisional response messages, such as the Session Progress (183) and Ring (180), to the ICS UE through the CSCF to notify the ICS UE about the current session progress.

The ICS UE can use the related answer message to answer the provisional response message. By sending the provisional response message and the corresponding answer message, the progress message can be sent and media negotiation can be made between the ICCF and the ICS UE.

The Steps 405~406 above are optional.

407~408: the ICCF uses the PS session control path (PS domain) to send the response of session control path switching acknowledgement to the ICS UE through the CSCF;

In this embodiment, the success response message (200 OK) is used as the response of session control path switching acknowledgement.

409~410: after the ICS UE receives the above response of session control path switching acknowledgement, it switches the session control path of the session to the PS session control path, that is, the ICS UE sets the session control path and transfers the subsequent session control information related to the session through the PS session control path; meanwhile, the ICS UE sends the request for the success response acknowledgement (ACK) to the ICCF through the CSCF.

411~412: the ICCF returns a success response to the ICS UE to answer the above request for the success response acknowledgement.

Until now, the switching of the session control path of the session is completed.

When the ICS UE has several sessions based on the CS session control path to be switched to the PS session control path, the steps 402~412 are repeated, while the process of switching the session control path of several sessions can be performed in parallel.

After all sessions based on the CS session control path in the ICS UE are switched to the PS session control path, the CS session control path can be released. Of course, the CS session control path might not be released under this condition, thus different kinds of session control information can be transferred in the PS and CS session control paths according to the feature of the session control information to be exchanged, for example, the session control messages with large amount of data is transferred in the PS session control path, and the session control messages with small amount of data is transferred in the CS session control path.

During the whole process of switching the session control path, the bearer control path and the bearer path of the session are remained unchanged so as to make the call continuous during the switching.

Based on the conception of the present invention, the following change can be made on the basis of the above embodiment:

The condition for switching the session control path in the aforementioned step 401 can be that the session control path needs to be switched to the PS domain based on the IMS network management strategy, if it is found out that the network resource in the CS domain is deficiency, the user is expected to switch the session control path to the PS domain.

Under this condition, the steps 402~412 can be replaced with the following steps:

402': the ICCF sends the request for switching the session control path to the CSCF through the PS session control path (PS domain);

403': the CSCF forwards the request for switching the session control path to the ICS UE;

404': the ICS UE accepts the request for switching the session control path, determines the session based on CS session control path to be switched according to the relevant information included in the request, and switches the session control path of the session to the PS session control path;

405'~406': the ICS UE sends one or more provisional response messages to the ICCF through the CSCF;

407'~408': the ICS UE sends the response of session control path switching acknowledgement to the ICCF through the CSCF;

409'~410': after the ICCF receives the above response of session control path switching acknowledgement, it switches the session control path of the session to the PS session control path, and sends the request for a success response acknowledgement (ACK) to the ICS UE through the CSCF;

411'~412': the ICS UE sends a success response to the ICCF to answer the above request for the success response acknowledgement.

Although the present invention is described in combination with the specific embodiments, those skilled in the field can make all kinds of modification or variations without departing from the spirit and essence of the present invention. All such modification or variations are intended to be included within the scope of the present invention as defined by the appended claims.

INDUSTRIAL APPLICABILITY

The method of the present invention can be used in the IP multimedia subsystem centralized services to switch the session control path between the CS session control path and the PS session control path according to different service requirements and the bearer load changes in the PS and CS domains on the premise of guaranteeing the continuity of the voice communication and not releasing the bearer control path and the bearer path corresponding to the ICS session, thus guarantee the service quality maximally and improve the degree of satisfaction of the users.

The invention claimed is:
1. A method for switching a session control path of an internet protocol multimedia core network subsystem centralized service, wherein, during an internet protocol multimedia core network subsystem centralized service session based on a first session control path, when a condition for switching the session control path is satisfied, the following steps are performed:

A: one party of: party (a) an internet protocol multimedia core network subsystem centralized service user equipment and party (b) an internet protocol multimedia core network subsystem circuit switched control function corresponding to the internet protocol multimedia core network subsystem centralized service session transmits a request for switching the session control path to another party, wherein each of party (a) and party (b) can transmit the request for switching the session control path;

B: after a receiving party of the request for switching the session control path receives the request, the receiving party identifies the internet protocol multimedia core network subsystem centralized service session corresponding to the request and sends a response of session control path switching acknowledgement to a transmitting party of the request; and C: said internet protocol multimedia core network subsystem circuit switched control function and said internet protocol multimedia core network subsystem centralized service user equipment sets the session control path corresponding to the identified internet protocol multimedia core network subsystem centralized service session as a second session control path, and subsequent session control information associated with the internet protocol multimedia core network subsystem centralized service session is transferred through the second session control path;

wherein each of the first or second session control path is one of a packet switched session control path and a circuit switched session control path; and wherein the first and second session control paths are of different kinds of control paths;

wherein said condition for switching the session control path is one or more of the following: (a) a domain interface corresponding to said first session control path does not meet communication requirement of the session control path or is not available, while a domain interface corresponding to the second session control path meets the communication requirement of the session control path; (b) according to service requirements, the session control path needs to be switched to the second session control path; (c) a message indicating to switch the session control path sent by the network according to operator's strategy is received; or (d) the session control path is switched to the second session control path based on internet protocol multimedia core network subsystem network management strategy, and wherein during the whole process of switching the session control path, a bearer control path and a bearer path of the session remain unchanged.

2. A method of claim 1, wherein said request for switching the session control path has relevant information which is used to identify the internet protocol multimedia core network subsystem centralized service session for which the session control path will be switched in said step B;

when said first and second session control paths are the circuit switched session control path and the packet switched session control path respectively, said relevant information is a dialog identifier or a voice call continuity switching identifier of said internet protocol multimedia core network subsystem centralized service session; and when said first and second session control paths are the packet switched session control path and the circuit switched session control path respectively, said relevant information is the dialog identifier or the voice call continuity switching number of said internet protocol multimedia core network subsystem centralized service session.

3. A method of claim 1, wherein said request for switching the session control path and the response of the session control path switching acknowledgement are sent through a bearer domain corresponding to said second session control path.

4. A method of claim 1, wherein said first and second session control paths are the circuit switched session control path and the packet switched session control path respectively; and wherein there is a step before said step A that includes: the internet protocol multimedia core network subsystem centralized service user equipment corresponding to said internet protocol multimedia core network subsystem centralized service session performs an internet protocol multimedia core network subsystem registration.

5. A method of claim 2, wherein said first and second session control paths are the circuit switched session control path and the packet switched session control path respectively; wherein said request for switching the session control path is a session initial protocol INVITE message; wherein by adding a new header field into the INVITE message or using parameters in a header field or a message body, indicating that the message is the request for switching the session control path; wherein if the voice call continuity switching identifier acts as said relevant information, the voice call continuity switching identifier is put into a called number field in said INVITE message; and wherein if the dialog identifier is taken as said relevant information, said dialog identifier is carried in a REPLACE header field or other header, fields or parameters in said INVITE message.

6. A method of claim 1, wherein said first and second session control paths are the circuit switched session control path and packet switched session control path respectively; wherein the following steps are included between step A and step B: after the receiving party of said request for switching the session control path receives the request, it sends one or more provisional response messages including processing progress information and/or media negotiation information to the transmitting party of said request; and the receiving party of said provisional response message returns a message including the media negotiation information.

7. A method of claim 1, wherein said first and second session control paths are the packet switched session control path and circuit switched session control path respectively; wherein the following step is included between step A and step B: one party of the internet protocol multimedia core network subsystem centralized service user equipment and the internet protocol multimedia core network subsystem circuit switched control function corresponding to said internet protocol multimedia core network subsystem centralized service session initiates establishment of a circuit switched session control path to the other party.

8. A method of claim 1, further comprising the following steps after said step C:

D: one party of the internet protocol multimedia core network subsystem centralized service user equipment and the internet protocol multimedia core network subsystem circuit switched control function sends a request for releasing the first session control path to the other party;

E: the internet protocol multimedia core network subsystem centralized service user equipment and the internet protocol multimedia core network subsystem circuit switched control function release the first session control path corresponding to the internet protocol multimedia core network subsystem centralized service session.

9. A method of claim 8, wherein said first and second session control paths are the packet switched session control path and circuit switched session control path respectively; wherein said request for releasing the first session control path includes information which is used to indicate the receiving party of the request to only release the first session control path corresponding to the request while not to release the bearer control path and the bearer path of the corresponding internet protocol multimedia core network subsystem centralized service session.

\* \* \* \* \*